US012736680B2

(12) United States Patent
Ghannam et al.

(10) Patent No.: US 12,736,680 B2
(45) Date of Patent: Sep. 15, 2026

(54) SYSTEMS AND METHODS OF ENVIRONMENTAL DETECTION FOR A VEHICLE

(71) Applicant: Ford Global Technologies, LLC, Dearborn, MI (US)

(72) Inventors: Mahmoud Yousef Ghannam, Canton, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 791 days.

(21) Appl. No.: 18/122,271

(22) Filed: Mar. 16, 2023

(65) Prior Publication Data

US 2024/0310522 A1 Sep. 19, 2024

(51) Int. Cl.
*G01S 17/89* (2020.01)
*G01S 7/4865* (2020.01)
*G01S 17/10* (2020.01)

(52) U.S. Cl.
CPC ............ *G01S 17/89* (2013.01); *G01S 7/4865* (2013.01)

(58) Field of Classification Search
CPC ...... G01S 17/89; G01S 7/4865; G01S 7/4802; G01S 17/931; B60H 1/008; B60H 1/00849; G06V 20/56; G06V 20/59; G08B 17/107
See application file for complete search history.

(56) References Cited

U.S. PATENT DOCUMENTS 7,164,468 B2 1/2007 Correia Da Silva Vilar et al.
10,282,625 B1 * 5/2019 Wengreen .......... G01C 21/3484
10,471,804 B1 11/2019 Wengreen et al.
10,479,319 B1 11/2019 Wengreen et al.
2015/0097687 A1 * 4/2015 Sloo ......................... G08B 5/36 340/632
2020/0273309 A1 * 8/2020 Lee ........................ G08B 17/10
2020/0309923 A1 * 10/2020 Bhaskaran ............ G01S 7/4802
2023/0059883 A1 * 2/2023 Hu ........................ G01S 17/931
2024/0005758 A1 * 1/2024 Ahl ........................ G06V 10/25

FOREIGN PATENT DOCUMENTS

JP 2020109670 A * 7/2020 ........... G08B 17/125
WO WO-2020197614 A1 * 10/2020 ........... G01S 13/931

OTHER PUBLICATIONS

Filonenko, Hoang, Jo, Smoke detection on roads for autonomous vehicles, Graduate School of Electrical Engineering, University of Ulsan, Ulsan, 680-749, Republic of Korea.

* cited by examiner

*Primary Examiner* — Isam A Alsomiri
(74) *Attorney, Agent, or Firm* — Frank Lollo; Price Heneveld LLP

(57) ABSTRACT

A method for monitoring an environment of a vehicle. The method includes generating, via at least one time-of-flight sensor, at least one point cloud representing the environment of the vehicle, the at least one point cloud including three-dimensional positional information of the environment. The method also includes detecting, via processing circuitry in communication with the at least one time-of-flight sensor, an aerosol in the environment. The method also includes estimating a quality of the aerosol based on at least one feature of the at least one point cloud. The method also includes determining a response condition based on the estimation of the quality. The method also includes communicating an instruction to execute the response condition.

13 Claims, 10 Drawing Sheets

24, 24b
120d
14
20
120
140
126
36
126
36

SYSTEMS AND METHODS OF ENVIRONMENTAL DETECTION FOR A VEHICLE

FIELD OF THE DISCLOSURE

The present disclosure generally relates to systems and methods of environmental detection for a vehicle and, more particularly, relates to detection and classification of aerial phenomena in or around a vehicle using light detection and ranging.

BACKGROUND OF THE DISCLOSURE

There is a need for a dynamic detection system for monitoring a vehicle environment.

SUMMARY OF THE DISCLOSURE

According to a first aspect of the present disclosure, a method for monitoring an environment of a vehicle. The method includes generating, via at least one time-of-flight sensor, at least one point cloud representing the environment of the vehicle. The at least one point cloud includes three-dimensional positional information of the environment. The method also includes detecting, via processing circuitry in communication with the at least one time-of-flight sensor, an aerosol in the environment. The method also includes estimating a quality of the aerosol based on at least one feature of the at least one point cloud. The method also includes determining a response condition based on the estimation of the quality. The method also includes communicating an instruction to execute the response condition.

Embodiments of the first aspect of the present disclosure can include any one or a combination of the following features:

- The at least one time-of-flight sensor includes a first light detection and ranging (LiDAR) module configured to generate a first point cloud of a compartment of the vehicle and a second LiDAR module configured to generate a second point cloud of a region exterior to the vehicle;
- identifying the aerosol in the second point cloud, comparing the second point cloud to the first point cloud, and determining an efficiency of an air filter of an air circulation system of the vehicle based on the comparison of the second point cloud to the first point cloud;
- receiving an indication of the air circulation system being in a recirculation mode, and determining an efficiency of the recirculation mode based on the comparison;
- determining an open state of a window of the vehicle based on the efficiency of the recirculation mode;
- communicating, via a window control system of the vehicle, a control signal to close the window based on the response condition;
- adjusting at least one operational parameter of the at least one time-of-flight sensor based on the response condition;
- the at least one operational parameter includes at least one of a scanning direction and a scanning frequency, and the method further includes controlling at least one of the scanning direction and the scanning frequency;
- the quality of the aerosol includes at least one of an identity, a location in the environment, a size of a cloud of the aerosol, a shape of the cloud, a level of light reflectance, a color, a density, a movement, or any combination thereof;
- determining a source of the aerosol based on the identity of the aerosol, determining the level of light reflectance based on the at least one point cloud, and determining the identity based on the level of light reflectance;
- the location includes an area of a compartment of the vehicle and a region exterior to the vehicle, and further includes identifying the location based on the at least one point cloud, and determining a source of the aerosol based on the location;
- determining a source of the aerosol based on the movement; and
- determining a source of the aerosol based on the shape.

According to a second aspect of the present disclosure, a system for monitoring an environment of a vehicle. The system includes at least one time-of-flight sensor configured to generate at least one point cloud representing the environment of the vehicle. The at least one point cloud includes three-dimensional positional information of the environment. The system also includes processing circuitry in communication with the at least one time-of-flight sensor configured to detect an aerosol in the environment, estimate a quality of the aerosol based on at least one feature of the at least one point cloud, determine a response condition based on the estimation of the quality, and communicate an instruction to execute the response condition.

Embodiments of the second aspect of the present disclosure can include any one or a combination of the following features:

- the quality of the aerosol includes at least one of an identity, a location in the environment, a size of a cloud of the aerosol, a shape of the cloud, a level of light reflectance, a color, a density, a movement, or any combination thereof;
- the processing circuitry is further configured to determine a source of the aerosol based on the identity of the aerosol;
- determine the level of light reflectance based on the at least one point cloud, and determine the identity based on the level of light reflectance; and
- the location includes an area of a compartment of the vehicle and a region exterior to the vehicle, and the processing circuitry is further configured to identify the location based on the at least one point cloud, and determine a source of the aerosol based on the location.

According to a third aspect of the present disclosure, a system for monitoring an environment of a vehicle. The system includes a first LiDAR module configured to generate a first point cloud of a compartment of the vehicle. The system also includes a second LiDAR module configured to generate a second point cloud of a region exterior to the vehicle. The system also includes an air circulation system of the vehicle including an air filter and configured to operate in an air recirculation mode. The system also includes processing circuitry in communication with the at least one time-of-flight sensor configured to identify an aerosol in the region exterior to the vehicle based on the second point cloud, compare the second point cloud to the first point cloud, and determine an efficiency of the air filter based on the comparison of the second point cloud to the first point cloud.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1A:
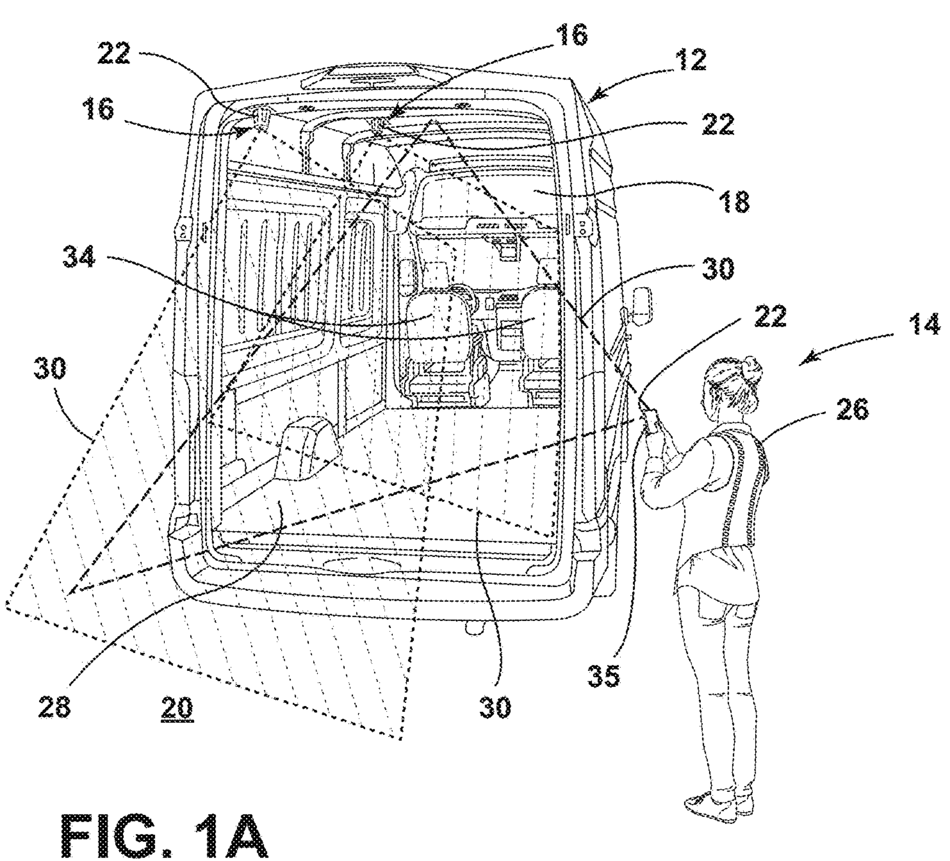
FIG. 1A is a perspective view of a cargo van incorporating a detection system of the present disclosure in a rear space of the cargo van.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements may or may not be to scale and certain components may or may not be enlarged relative to the other components for purposes of emphasis and understanding.

For purposes of description herein, the terms "upper," "lower," "right," "left," "rear," "front," "vertical," "horizontal," and derivatives thereof shall relate to the concepts as oriented in FIG. 1A. However, it is to be understood that the concepts may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to environmental detection for a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring generally to FIGS. 1A-5, the present disclosure generally relates to a detection system 10 for a vehicle 12 that utilizes three-dimensional image sensing to detect information about an environment 14 in or around the vehicle 12. The three-dimensional image sensing may be accomplished via one or more time-of-flight (ToF) sensors 16 that are configured to map a three-dimensional space such as an interior 18 of the vehicle 12 and/or a region exterior 20 to the vehicle 12. For example, the one or more time-of-flight sensors 16 may include at least one light detection and ranging (LiDAR) module 22 configured to output pulses of light, measure a time of flight for the pulses of light to return from the environment 14 to the at least one LiDAR module 22, and generate at least one point cloud 24 of the environment 14 based on the time-of-flight of the pulses of light. In this way, the LiDAR module 22 may provide information regarding three-dimensional shapes of the environment 14 being scanned, including geometries, proportions, or other measurement information related to the environment 14 and/or occupants 26 for the vehicle 12.

The LiDAR modules 22 of the present disclosure may operate conceptually similarly to a still frame or video stream, but instead of producing a flat image with contrast and color, the LiDAR module 22 may provide information regarding three-dimensional shapes of the environment 14 being scanned. Using time-of-flight, the LiDAR modules 22 are configured to measure the round-trip time taken for light to be transmitted, reflected from a surface, and received at a sensor near the transmission source. The light transmitted may be a laser pulse. The light may be sent and received millions of times per second at various angles to produce a matrix of the reflected light points. The result is a single measurement point for each transmission and reflection representing distance and a coordinate for each measurement point. When the LiDAR module 22 scans the entire "frame," or field of view 30, it generates an output known as a point cloud 24 that is a 3D representation of the features scanned.

In some examples, the LiDAR modules 22 of the present disclosure may be configured to capture the at least one point cloud 24 independent of visible-light illumination of the environment 14. For example, the LiDAR modules 22 may not require ambient light to achieve the spatial mapping techniques of the present disclosure. For example, the LiDAR module 22 may emit and receive infrared (IR) or near-infrared (NIR) light, and therefore generate the at least one point cloud 24 despite visible-light conditions. Further, as compared to Radio Detection and Ranging (RADAR), the depth-mapping achieved by the LiDAR modules 22 may have greater accuracy due to the rate at which the LiDAR pulses may be emitted and received (e.g., the speed of light). Further, the three-dimensional mapping may be achieved without utilizing radio frequencies (RF), and therefore may limit or eliminate need for RF certifications for operation. Accordingly, sensors incorporated for monitoring frequencies and magnitudes of RF fields may be omitted by providing the present LiDAR modules 22.

Figure 1B:
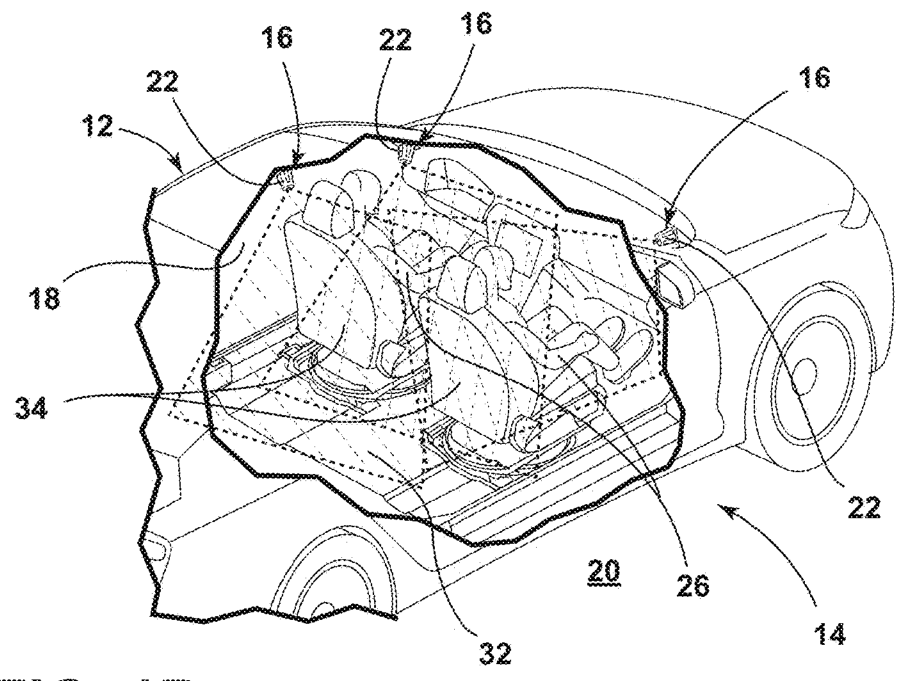
FIG. 1B is a perspective view of a car incorporating a detection system of the present disclosure in a passenger cabin of the car.

Referring now more particularly to FIGS. 1A and 1B, a plurality of the LiDAR modules 22 may be configured to monitor a compartment 28 of the vehicle 12. In the example illustrated in FIG. 1A, the LiDAR modules 22 are configured with a field of view 30 that covers the rear space of the vehicle 12, as well as the region exterior 20 to the vehicle 12. In this example, the region exterior 20 to the vehicle 12 is a space behind the vehicle 12 adjacent to an entry or an exit to the vehicle 12. In FIG. 1B, the plurality of LiDAR modules 22 are configured to monitor a front space of the vehicle 12, with the field of view 30 of one or more of the plurality of LiDAR modules 22 covering a passenger cabin 32 of the vehicle 12. As will be described further herein, it is contemplated that the plurality of LiDAR modules 22 may be in communication with one another to allow the at least one point cloud 24 captured from each LiDAR module 22 to be compared to one another to render a greater-accuracy representation of the environment 14. For example, and as depicted in FIG. 1A, the occupant 26 or another user may direct a mobile device 35 toward the environment 14 to generate an additional point cloud 24 from a viewing angle different than the field-of-views 30 of the LiDAR modules 22 of the vehicle 12. For example, the mobile device 35 may be a cellular phone having one of the LiDAR modules 22. In general, the time-of-flight sensors 16 disclosed herein may capture point clouds 24 of various features of the environment 14, such as seats 34, occupants 26, and various other surfaces or items present in the interior 18 or the region exterior 20 to the vehicle 12. As will further be discussed herein, the present system 10 may be operable to identify these features based on the at least one point cloud 24 and make determinations and/or calculations based on the identities, spatio-temporal positions of the features, and/or other related aspects of the features detected in the at least one point cloud 24.

Figure 2A:
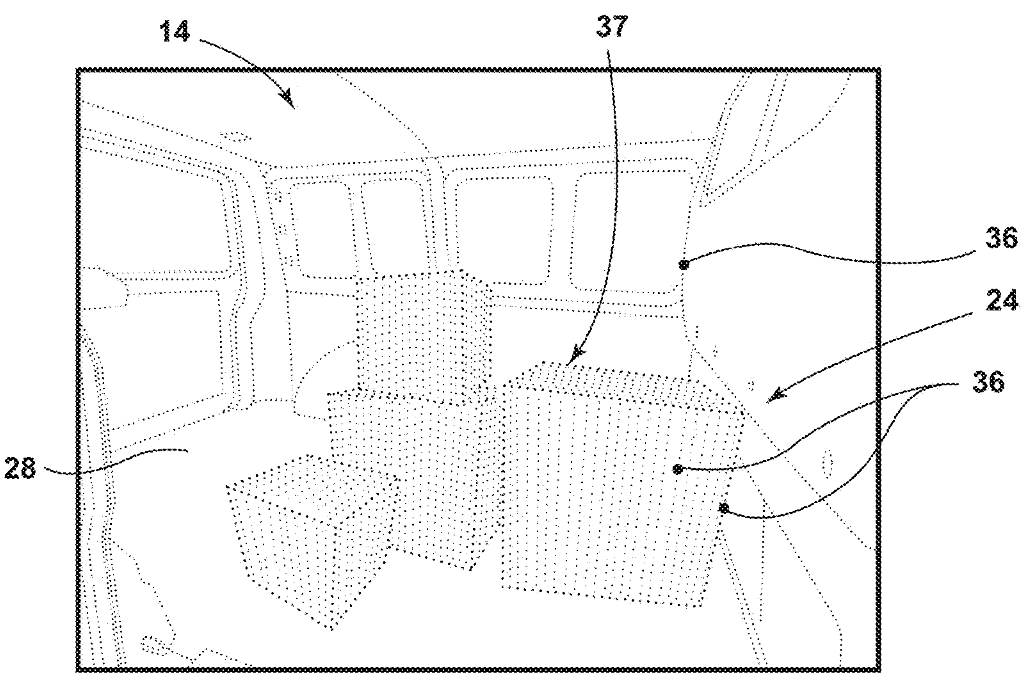
FIG. 2A is a representation of a point cloud generated by a time-of-flight sensor configured to monitor a rear space of a cargo van of the present disclosure.
Figure 2B:
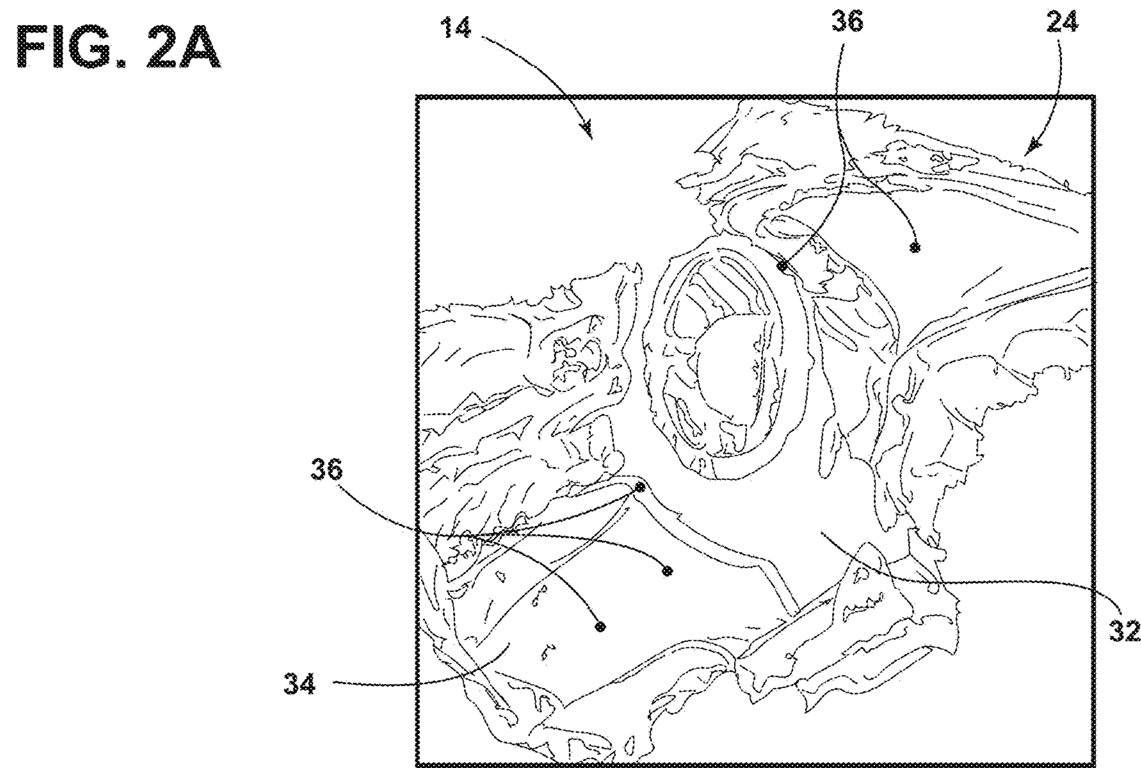
FIG. 2B is a representation of a point cloud generated by a time-of-flight sensor configured to monitor a passenger compartment of a vehicle of the present disclosure.

Referring now to FIGS. 2A and 2B, representations of at least one point cloud 24 generated from the LiDAR modules 22 in the interiors 18 of the vehicle 12 of FIGS. 1A and 1B, respectively, are presented to illustrate the three-dimensional mapping of the present system 10. For example, the depictions of the at least one point cloud 24 may be considered three-dimensional images constructed by the LiDAR modules 22 and/or processors in communication with the LiDAR modules 22. Although the depictions of the at least one point clouds 24 illustrated in FIGS. 2A and 2B may differ in appearance, it is contemplated that such difference may be a result of averaging depths of the points 36 of each point cloud 24 to render a surface (FIG. 2B) as opposed to individual dots (FIG. 2A). The underlying 3D data may be generated the same way in either case.

Still referring to FIGS. 2A and 2B, each point cloud 24 includes the three-dimensional data (e.g., a three-dimensional location relative to the LiDAR module 22) for the various features in the interior 18. For example, the at least one point cloud 24 may generate 3D mapping of the occupants 26 or cargo 37 in the interior 18. The three-dimensional data may include the rectilinear coordinates, with XYZ coordinates, of various points 36 on surfaces or other light-reflective features relative to the LiDAR module 22. It is contemplated that the coordinates of each point 36 may be virtually mapped to an origin point other than the LiDAR module 22, such as a center of mass of the vehicle, a center of volume of the compartment 28 being monitored, or any other feasible origin point. By obtaining the three-dimensional data of the various features in the interior 18 and, in some cases, the region exterior 20 to the vehicle 12, the present system 10 may provide for enhanced monitoring methods to be performed without complex imaging methods, such as those incorporating stereoscopic imagers or other three-dimensional monitoring devices that may require higher computational power or decreased efficiencies.

Figure 3:
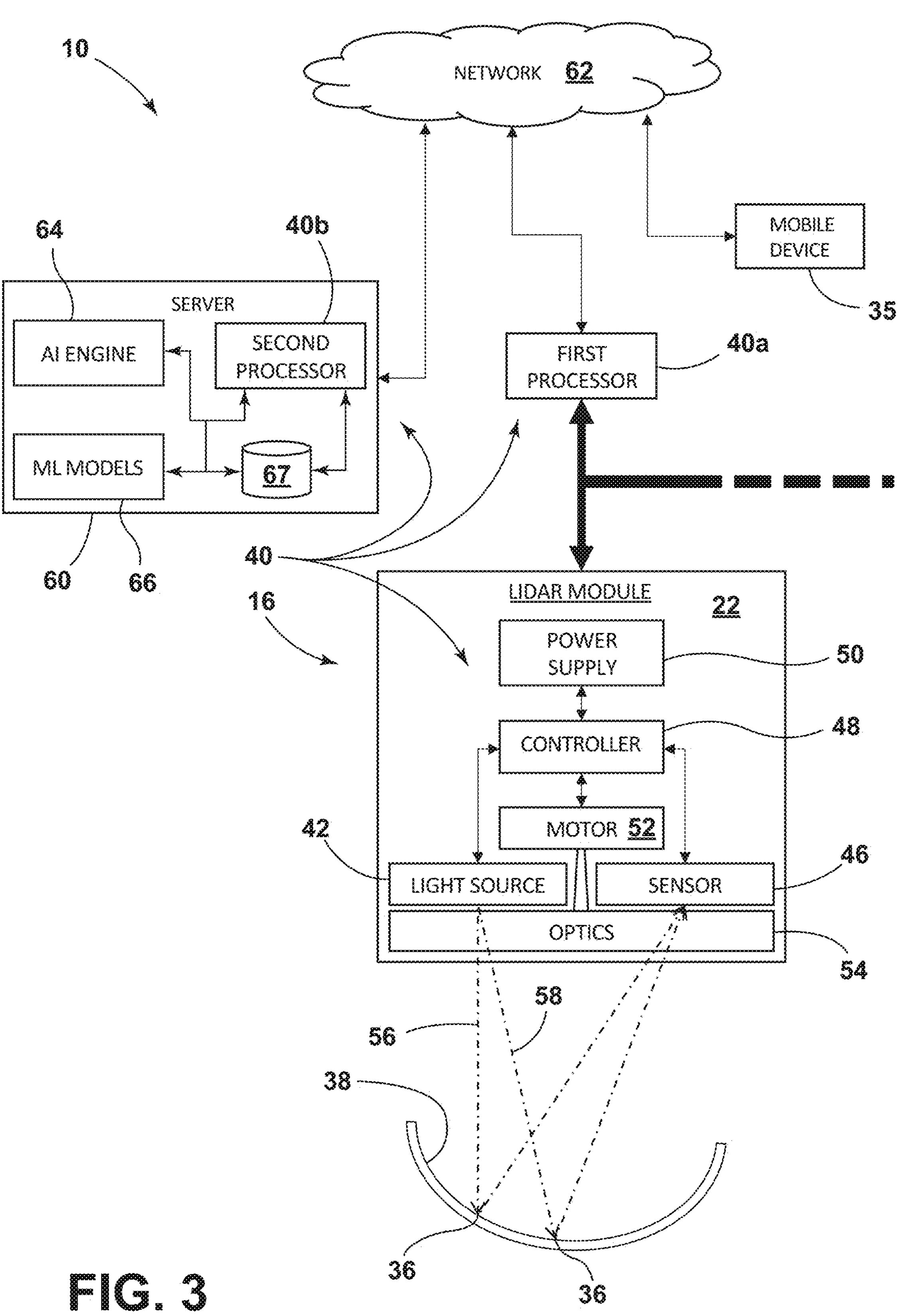
FIG. 3 is a block diagram of an exemplary detection system incorporating light detection and ranging.

Referring now to FIG. 3, at least a portion of the present detection system 10 is exemplarily applied to a target surface 38, such as to the cargo 37 or other surfaces in the environment 14 of the vehicle 12. The system 10 may include processing circuitry 40, which will be further discussed in relation to the proceeding figures, in communication with one or more of the time-of-flight sensors 16. In the present example, the time-of-flight sensors 16 include the LiDAR modules 22 each having a light source 42, or emitter, and a sensor 46 configured to detect reflection of the light emitted by the light source 42 off of the target surface 38. A controller 48 of the LiDAR module 22 is in communication with the light source 42 and the sensor 46 and is configured to monitor the time-of-flight of the light pulses emitted by the light source 42 and returned to the sensor 46. The controller 48 is also in communication with a power supply 50 configured to provide electrical power to the controller 48, the light source 42, the sensor 46, and a motor 52 that is controlled by the controller 48. In the present example, the LiDAR module 22 incorporates optics 54 that are mechanically linked to the motor 52 and are configured to guide the light pulses in a particular direction. For example, the optics 54 may include lenses or mirrors that are configured to change an angle of emission for the light pulses and/or return the light pulses to the sensor 46. For instance, the motor 52 may be configured to rotate a mirror to cause light emitted from the light source 42 to reflect off of the mirror at different angles depending on the rotational position of the motor 52.

In some examples, the optics 54 may include a first portion associated with the source 42 and a second portion associated with the sensor 46. For example, a first lens, which may move in response to the motor 52, may be configured to guide (e.g., collimate, focus) the light emitted by the source 42, and a second lens, which may be driven by a different motor or a different connection to the motor 52, may be configured to guide the light reflected off the target surface 38 and returned to the sensor 46. Accordingly, the general configuration of the LiDAR module 22 may incorporate a single housing having different sets of optics or a plurality of housings with different optics. For example, the source 42 may be located in a first housing of the LiDAR module 22, the sensor 46 may be located in a second housing separate from or spaced from the first housing. In this way, each of the LiDAR modules 22 may refer to any emitter/receiver combination system that emits LiDAR pulses and receives the LiDAR pulses either at a common location in the vehicle 12 or at different locations in the vehicle 12.

The light emitted and received by the present LiDAR modules 22 may have a wavelength in the range of between approximately 780 nanometers (nm) and 1700 nm. In some examples, the wavelength of the LiDAR is preferably in the range of between 900 nm and 1650 nm. In other examples, the wavelength of the LiDAR is preferably between 1500 nm and 1650 nm. In some examples, the wavelength of the LiDAR is preferably at least 1550 nm. It is contemplated that the particular wavelength/frequency employed by the LiDAR modules 22 may be based on an estimated distance range for capturing the depth information. For example, for shorter ranges (e.g., between 1 m and 5 m) the LiDAR may operate with a greater wavelength of light (e.g., greater than 1000 nm). The LiDAR modules 22 of the present disclosure may be configured to output light, in the form of a laser, at a wavelength of at least 1550 nm while the motor 52 rotates the optics 54 to allow mapping an area. In some examples, the LiDAR modules 22 of the present disclosure are configured to emit light having a wavelength of at least 1650 nm. Due to the relatively short distances scanned by the present LiDAR modules 22 (e.g., between one and five meters), such relatively low infrared (IR) or near-infrared (NIR) may be employed to achieve the three-dimensional spatial mapping via the at least one point cloud 24 with low power requirements. The present LiDAR modules 22 may be either single point-and-reflect modules or may operate in a rotational mode, as described above. In rotational mode, the LiDAR module 22 may measure up to 360 degrees based on the rate of rotation, which may be between 1 and 100 Hertz or may be at least 60 rotations per minute (RPM) in some examples.

In the example depicted in FIG. 3, the time-of-flight for a first pulse of light 56 emitted by the light source 42 and returned to the sensor 46 may be less than a second time-of-flight for a second light pulse emitted by the light source 42 returned to the sensor 46. For example, the first pulse of light 56 may travel a shorter distance than the second pulse of light 58 due to a difference in depth, height, or width of the corresponding reflection point 36 on the target surface 38. In this way, the LiDAR module 22 may generate the at least one point cloud 24 to be representative of the environment 14 (e.g., the target surface 38 in the present example) in three dimensions.

The processing circuitry 40 of the present disclosure may be provided to amalgamate the point cloud 24 from each of a plurality of the LiDAR modules 22 and process the coordinates of the features to determine an identity of the features, as well as to perform other processing techniques that will be further described herein. The processing circuitry 40 may include a first processor 40*a* local to the vehicle 12 and a second processor 40*b* remote from the vehicle 12. Further, the processing circuitry 40 may include the controller 48 of the LiDAR module 22. In some examples, the controller 48 may be configured to generate or determine the at least one point cloud 24 and/or point cloud data, and the first processor 40*a* may be configured to receive the at least one point cloud 24 from each LiDAR module 22 and compile each point cloud 24 of a common scene, such as the environment 14, to generate a more expansive or more accurate point cloud 24 of the environment 14.

The second processor 40*b*, which may be a part of a remote server 60 and in communication with the first processor 40*a*, via a network 62, may be configured to perform various modifications and/or mapping of the at least one point cloud 24 to target three-dimensional image data for the environment 14. For example, the server 60 may include an artificial intelligence (AI) engine 64 configured to train machine learning models 66 based on the point cloud data captured via the LiDAR modules 22 and/or historical data previously captured by the time-of-flight sensors 16. The second processor 40*b* may be in communication with the AI engine 64, as well as in communication with a database 67 configured to store the target point cloud data and/or three-dimensional image information. Accordingly, the server 60 may incorporate a memory storing instructions that, when executed by the processor, cause the processing circuitry 40 to compare the at least one point cloud 24 to point cloud data corresponding to target conditions of the interior 18 and/or the region exterior 20 to the vehicle 12. In this way, the detection system 10 may employ the processing circuitry 40 to perform advanced detection techniques and to communicate with subsystems of the vehicle 12, as will be described in the proceeding figures. In this way, the detection system 10 may be employed in tandem or in conjunction with other operational parameters for the vehicle 12. For example, the detection system 10 may be configured for communicating notifications to the occupants 26 of alert conditions, controlling the various operational parameters in response to actions detected in the interior 18, activating or deactivating various subsystems of the vehicle 12, or interacting with any vehicle systems to effectuate operational adjustments.

Figure 4:
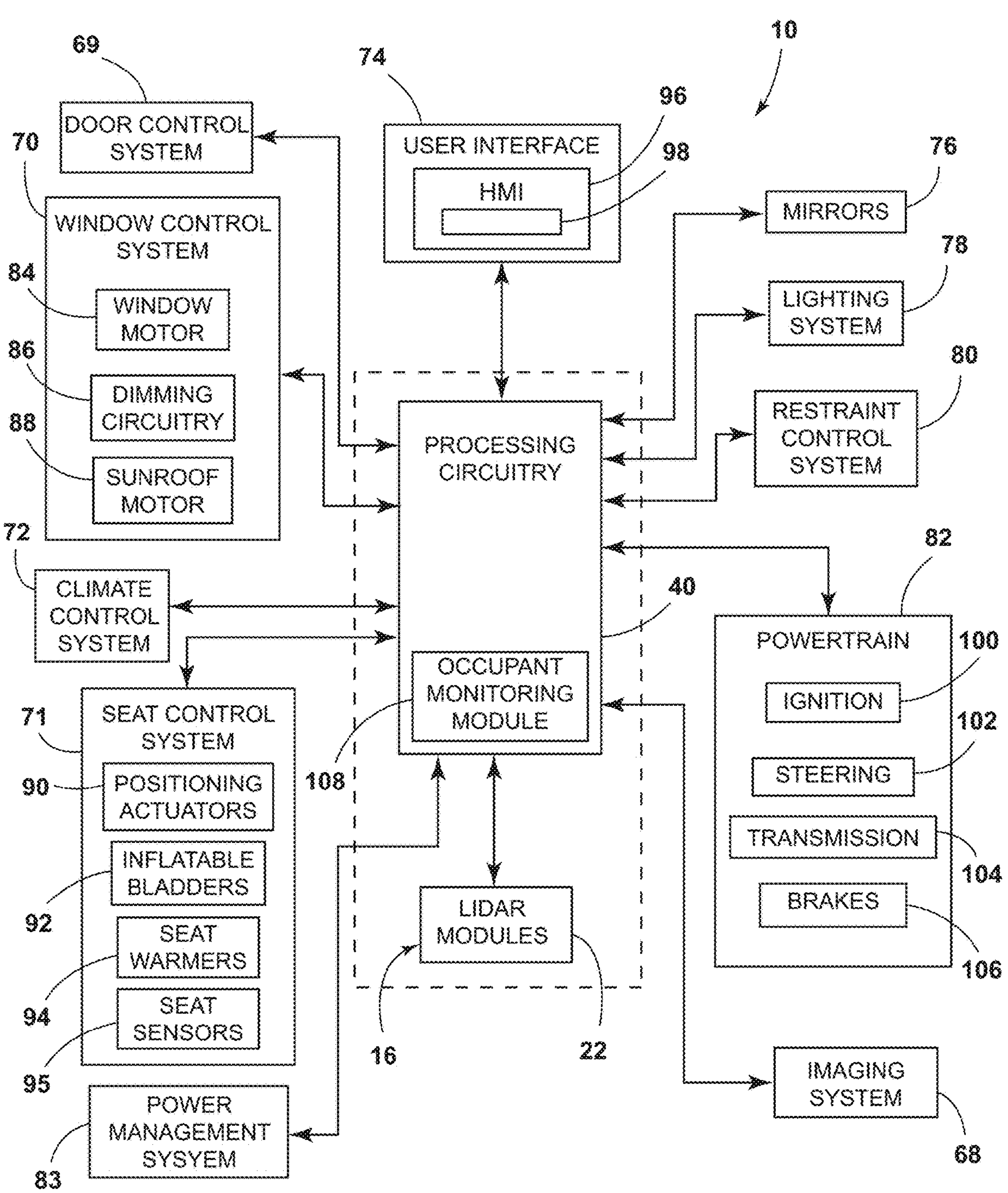
FIG. 4 is a block diagram of an exemplary detection system for a vehicle.

Referring now to FIG. 4, the detection system 10 may incorporate or be in communication with various systems of the vehicle 12 (e.g., vehicle systems). For example, the processing circuitry 40 may be configured to communicate with an imaging system 68 that includes imaging devices, such as cameras (e.g., red-, green-, and blue-pixel (RGB) or IR cameras). The processing circuitry 40 may further be in communication with other vehicle systems, such as a door control system 69, a window control system 70, a seat control system 71, a climate control system 72, a user interface 74, mirrors 76, a lighting system 78, a restraint control system 80, a powertrain 82, a power management system 83, or any other vehicle systems. Communication with the various vehicle systems may allow the processing circuitry 40 to transmit and receive signals or instructions to the various vehicle systems based on processing of the at least one point cloud 24 captured by the time-of-flight sensors 16. For example, when the processing circuitry 40 identifies a number of occupants 26 in the vehicle 12 based on the at least one point cloud 24, the processing circuitry 40 may communicate an instruction to adjust the seat control system 71 and/or the climate control system 72. In another non-limiting example, the processing circuitry 40 may receive information or signals from the lighting system 78 and control operation of the time-of-flight sensors 16 based on the information from the lighting system 78. Accordingly, the processing circuitry 40 may control, or communicate instructions to control, the time-of-flight sensors 16 based on information from the vehicle systems and/or may communicate signals or instructions to the various vehicle systems based on information received from the time-of-flight sensors 16.

The window control system 70 may include a window motor 84 for controlling a position of a window of the vehicle 12. Further, the window control system 70 may include dimming circuitry 86, which may be glazing dimming circuitry 86, for controlling an opacity and/or level of light transmitted between the interior 18 of the vehicle 12 and the region exterior 20 to the vehicle 12. One or more sunroof motors 88 may be provided with the window control system 70 for controlling closing and opening of a sunroof panel. It is contemplated that other devices may be included in the window control system 70, such as window locks, window breakage detection sensors, and other features related to operation of the windows of the vehicle 12. By providing communication between the window control system 70 and processing circuitry 40 of the present disclosure, the window control system 70 may be configured to adjust one or more of its features based on conditions determined or detected by the processing circuitry 40 based on the at least one point cloud 24. Similarly, the window control system 70 may transmit one or more signals to the processing circuitry 40, and the processing circuitry 40 may control operation of the time-of-flight sensors 16 based on the signals from the window control system 70.

The climate control system 72 may include one or more heating and cooling devices, as well as vents configured to distribute heated or cooled air into the interior 18 of the vehicle 12. Although not specifically enumerated in FIG. 4, the climate control system 72 may be configured to actuate a vent to selectively limit and allow heated air or cooled air to circulate in the interior 18 of the vehicle 12. Further, the climate control system 72 may be configured to operate heating, ventilation, and air conditioning (HVAC) systems to recirculate air or to vent air to the region exterior 20 to the vehicle 12.

The seat control system 71 may include various positioning actuators 90, inflatable bladders 92, seat warmers 94, and/or other ergonomic and/or comfort features for seats 34 in the vehicle 12. For example, the seat control system 71 may include motors configured to actuate the seat 34 forward, backward, up, down, side to side, or rotationally. Both a backrest of the seat 34 and a lower portion of the seat 34 may be configured to be adjusted by the positioning actuators 90. The inflatable bladders 92 may be provided within the seat 34 to adjust a firmness or softness of the seat 34, and seat warmers 94 may be provided for warming cushions in the seat 34 for comfort of the occupants 26. In one non-limiting example, the processing circuitry 40 may compare the position of the seats 34 based on seat sensors 95, such as position sensors, occupancy detection sensors, or other sensors configured to monitor the seats 34, to the point cloud data captured by the time-of-flight sensors 16 in order to verify or check an estimated seat position based on the point cloud data. In other examples, the processing circuitry 40 may communicate one or more signals to the seat control system 71 based on body pose data identified in the at least one point cloud 24. In yet further examples, the processing circuitry 40 may be configured to adjust an operational parameter of the time-of-flight sensors 16, such as a scanning direction, a frequency of the LiDAR module 22, or the like, based on the position of the seats 34 being monitored by the time-of-flight sensors 16.

The user interface 74 may include a human-machine interface (HMI) 96 and/or may include audio devices, such as microphones and/or speakers, mechanical actuators, such as knobs, buttons, switches, and/or a touchscreen 98 incorporated with the HMI 96. The human-machine interface 96 may be configured to present various digital objects representing buttons for selection by the user via, for example, the touchscreen 98. In general, the user interface 74 may communicate with the processing circuitry 40 to activate or deactivate the time-of-flight sensors 16, adjust operational parameters of the time-of-flight sensors 16, or control other aspects of the time-of-flight sensors 16. Similarly, the processing circuitry 40 may be configured to communicate instructions to the user interface 74 to present information and/or other data related to the detection and/or processing of the at least one point cloud 24 based on the time-of-flight sensors 16. It is further contemplated that the mobile device 35 may incorporate a user interface 74 to present similar options to the user at the mobile device 35.

Still referring to FIG. 4, other vehicle systems include the mirrors 76, the lighting system 78, and the restraint control system 80. These other vehicle systems may also be adjusted based on the at least one point cloud 24 generated by the time-of-flight sensors 16 and processed by the processing circuitry 40. Additionally, subcomponents of these systems (e.g., sensors, processors) may be configured to send instructions or data to the processing circuitry 40 to cause the processing circuitry 40 to operate the time-of-flight sensors 16 in an adjusted operation. For example, the processing circuitry 40 may be configured to deactivate the time-of-flight sensors 16 in response to the lighting system 78 detecting adequate lighting to allow for visible light and/or IR occupant monitoring. In some examples, the processing circuitry 40 may communicate an instruction to adjust a position of the mirrors 76 based on the at least one point cloud 24. For example, the at least one point cloud 24 may demonstrate an event, such as an orientation of a driver, a position of another vehicle in the region exterior 20 to the vehicle 12, or any other positional feature, and generate a signal to the mirrors 76 (or associated positioning members) to move the mirrors 76 to align a view with the event.

Referring again to FIG. 4, the vehicle 12 may include the powertrain 82 that incorporates an ignition system 100, a steering system 102, a transmission system 104, a brake system 106, and/or any other system configured to drive the motion of the vehicle 12. In some examples, the at least one point cloud 24 captured by the time-of-flight sensors 16 may be processed by the processing circuitry 40 to determine target steering angles, rates of motion or speed changes, or other vehicle operations for the powertrain 82, and communicate the target operations to the powertrain 82 to allow for at least partially autonomous control over the motion of the vehicle 12. Such at least partially autonomous control may include fully autonomous operation or semiautonomous operation of the vehicle 12. For example, the processing circuitry 40 may communicate signals to adjust the brake system 106, the ignition system 100, the transmission system 104, or another system of the powertrain 82 to stop the vehicle 12 or move the vehicle 12.

The processing circuitry 40 may further include an occupant monitoring module 108 that may communicate with any of the vehicle systems described above, as well as the time-of-flight sensors 16 of the present disclosure. The occupant monitoring module 108 may be configured to store various algorithms for detecting aspects related to the occupants 26. For example, the algorithms may be executed to monitor the interior 18 of the vehicle 12 to identify occupants 26 in the vehicle 12, a number of occupants 26, or other occupancy features of the interior 18 using the point cloud data and/or video or image data captured by the imaging system 68. Similarly, various seat sensors 95 of the seat control system 71, heating or cooling sensors that detect manual manipulation of the vents for heating or cooling control for the climate control system 72, inputs to the window control system 70, or any other sensor of the vehicle systems previously described may be processed in the occupant monitoring module 108 to detect positions of occupants 26 in the vehicle 12, conditions of occupants 26 in the vehicle 12, states of occupants 26 in the vehicle 12, or any other relevant occupancy features that will be described herein. The processing circuitry 40 may also include various classification algorithms for classifying objects detected in the interior 18, such as for the cargo 37, mobile devices 35, animals, and any other living or nonliving item in the interior 18. Accordingly, the processing circuitry 40 may be configured to identify an event in the interior 18 or predict an event based on monitoring of the interior 18 by utilizing information from the other vehicle systems.

In general, the detection system 10 may provide for spatial mapping of the environment 14 of the vehicle 12. For example, the LiDAR modules 22 may detect the position, in three-dimensional space, of objects, items, or other features in the interior 18 or the region exterior 20 to the vehicle 12. Such positions, therefore, include depth information of the scene captured by the LiDAR module 22. As compared to a two-dimensional image captured by a camera, the at least one point cloud 24 generated by the time-of-flight sensor 16 allows for more efficient determination of how far the features are from the LiDAR module 22 and from one another. Thus, complex image analysis techniques involving pixel analysis, comparisons of RGB values, or other techniques to estimate depth may be omitted due to utilization of the ToF sensors 16. Further, while multiple imaging devices from different angles of a common scene (e.g., a stereoscopic imager) may allow for more accurate estimation of depth information than those produced by a single camera, complex data processing techniques may be required for multiple cameras to be employed to gather the depth information. Further, such multi-camera systems may require additional weight, packaging volume, or other inefficiencies relative to the time-of-flight sensors 16 of the present disclosure.

Accordingly, the detection system 10 may be computationally-efficient and/or power-efficient relative to two-dimensional and three-dimensional cameras for determining positional information. Further, other time-of-flight sensing techniques, such as RADAR, while providing depth information, may present certification issues based on RF requirements and may be less accurate than the present LiDAR modules 22. Further, a number of cameras used for monitoring the environment 14 may be reduced, various presence detectors (vehicle seat sensors 95) may be omitted, and other sensors configured to determine positional information about the environment 14 may be omitted due to the precision of the LiDAR. Thus, a solution may be provided by the detection system 10 by reducing the number of sensors required to monitor various aspects of the environment 14.

Referring now to FIGS. 5-11, the present detection system 10 may be a system 10 for monitoring the environment 14 of the vehicle 12. The detection system 10 may include at least one of the three-dimensional image sensors configured to generate at least one point cloud 24 representing the environment 14 of the vehicle 12. The at least one point cloud 24 includes three-dimensional positional information about the environment 14. The processing circuitry 40 in communication with the at least one time-of-flight sensor 16 is configured to detect an aerosol 120 in the environment 14, estimate a quality of the aerosol 120 based on at least one feature of the at least one point cloud 24, determine a response condition based on the estimation of the quality of the aerosol 120, and communicate an instruction to execute the response condition. In some examples, the at least one time-of-flight sensor 16 includes a first LiDAR module **22*a* configured to capture a first point cloud 24*a* of the compartment 30 of the vehicle 12 and a second LiDAR module 22*b* configured to capture a second point cloud 24*b* of the region exterior 20 to the vehicle 12. Accordingly, the detection system 10 may be configured to detect the presence and/or qualities of aerosols 120 in either the interior 18 of the vehicle 12 and/or the region exterior 20 to the vehicle 12**.

It is contemplated that the quality of the aerosol 120 may be based on attributes, or features, of the point clouds **24*a*, 24*b*. For example, the features of the point clouds 24*a*, 24*b* may include the distribution of the coordinates of the points 36 in each point cloud 24, the relative location of points 36 in each point cloud 24, or other positional information derived from the point clouds 24*a*, 24*b*. Thus, the features of the point clouds 24*a*, 24*b* may be positional in nature, while the quality of the aerosol 120** may refer to attributes of the substance, such as color, shape, chemical makeup, density, source-identifiers, or any other property of a pollutant or airborne particulate.

Figure 5:
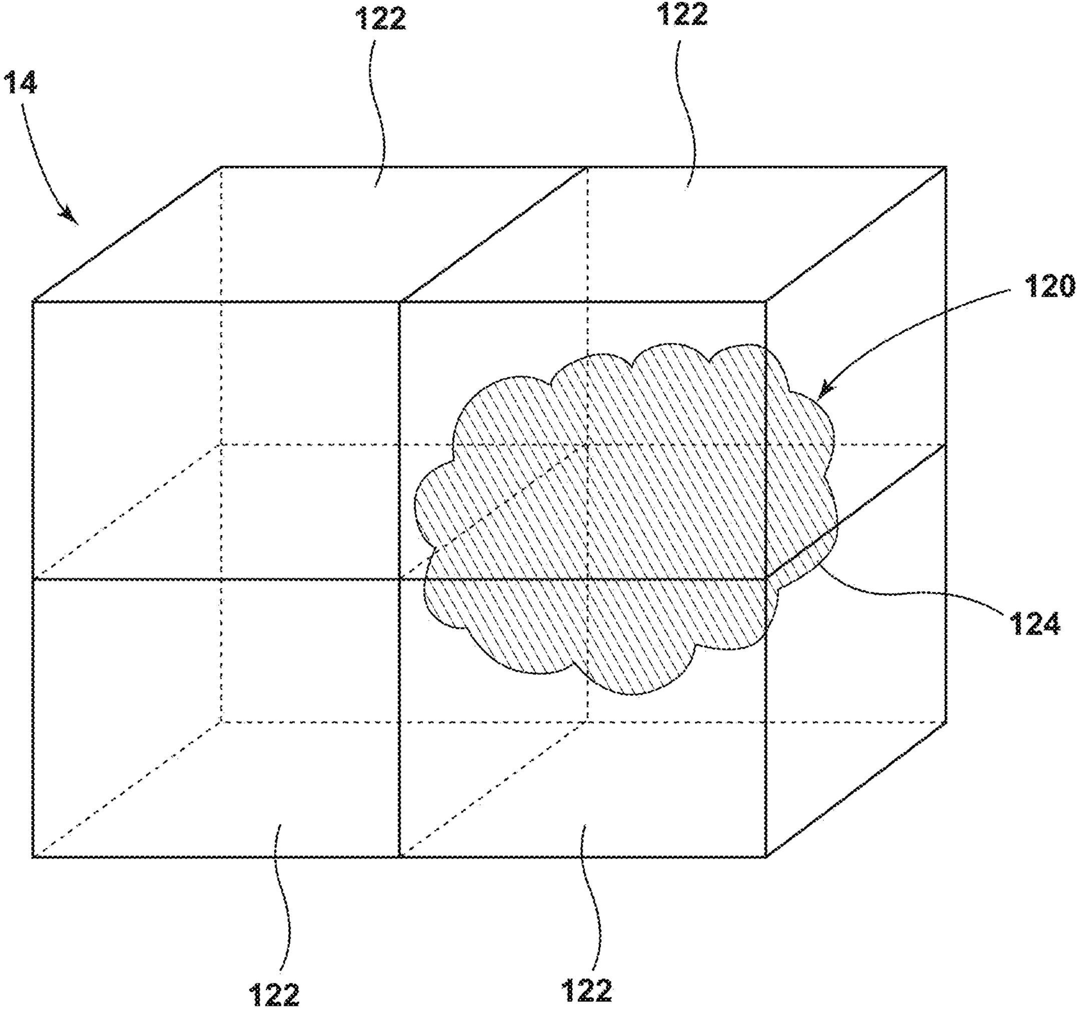
FIG. 5 is a perspective view of a cloud in a volume of space segmented into zones demonstrating a relative location of the cloud.

Referring now more particularly to FIG. 5, the aerosol 120 may be detected by the processing circuitry 40 based on a location, a shape, or another quality of the aerosol 120 based on the shape of the point cloud 24 detected in the environment 14. For example, as depicted, the environment 14 may be logically segmented into one or more zones 122. Based on the presence of the point cloud 24 in the one or more zones 122, a distribution, a shape, or any other positional quality of the aerosol 120 may be determined by the processing circuitry 40. For example, the controller 48 of the one or more LiDAR modules 22, the first processor **40*a*, the second processor 40*b*, or another processing device of the processing circuitry 40 may be configured to identify the location of the aerosol 120 by segmenting the environment 14 captured in the field of view 30 of the LiDAR modules 22 into the one or more zones 122. In some examples, the point cloud 24 generated by the time-of-flight sensors 16 may take the form of a plume 124, as depicted, which may be associated with a source of the aerosol 120. For example, the plume 124 may indicate smoke is the result of a source of a thermal event. In other examples, as will be described further herein, the aerosol 120 takes the form of a mist, a fog, a cloud, a haze, a vapor, dust, or any other form of aerosol. In general, the point cloud 24 representing the aerosol 120 may be generated based on the amount of atmospheric attenuation, or a gradual loss in intensity of light reflected off of the pollutants or particulates in the aerosol 120 and returned to the LiDAR modules 22. For example, groupings of water vapor, such as in the event of the aerosol 120 being a mist, may result in less light being reflected by the aerosol 120** and provide for a more transparent extraction of the three-dimensional data.

Figure 6:
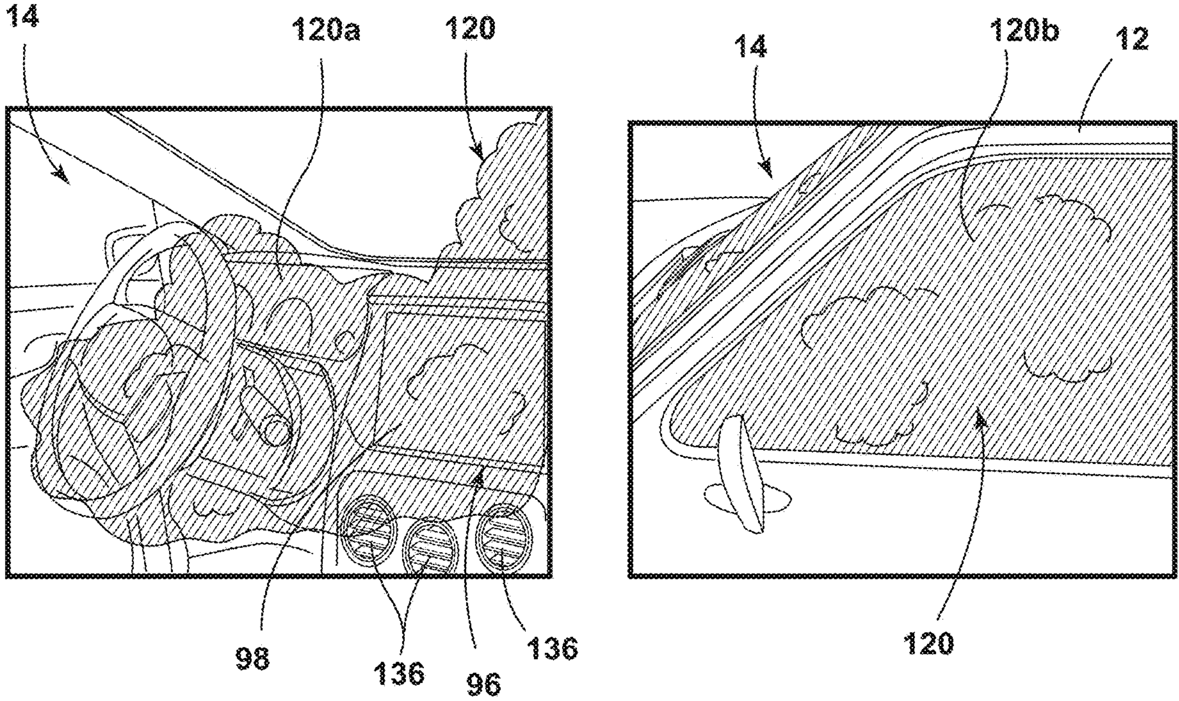
FIG. 6 illustrates two images of clouds present in an interior of a vehicle.

For example, in the illustrated examples in FIG. 6, the aerosols 120 may present different levels of reflection based on differing groupings and compositions of matter in the airborne phenomena. For example, as illustrated in the left example of FIG. 6, water vapor or another form of a mild aerosol 120*a* may present wisps or mist that may be visibly noticeable or noticeable within the IR/NIR spectrum. Accordingly, light reflected from the mist may result in points 36 of the point cloud 24*a* being detected and blocking spatial mapping behind the aerosol 120 relative to the time-of-flight sensor 16. In the example illustrated on the right side of FIG. 6, the plume 124 of smoke, or another form of a dense aerosol 120*b*, may reveal little to no light penetration through the aerial phenomena, such that some or all of the light emitted from the time-of-flight sensor 16 may be reflected off of the aerosol 120 toward the LiDAR module 22, resulting in limited mapping of the passenger compartment 28 in the example illustrated. While the images depicted in FIG. 6 are exemplary and illustrate the visible light reflectance of the aerosol 120, it is contemplated that, as will be illustrated in further examples, infrared, or near-infrared light reflected by the aerosols 120 may completely block out portions behind the aerosols 120, resulting in depth mapping indicating matter in a space typically empty or void of objects in the passenger cabin 32. Accordingly, the processing circuitry 40 may be configured to detect the aerial phenomena and classify the aerial phenomena based on the level of light reflectance, a distribution of the aerial phenomena (e.g., cloud, plume 124, mist, smoke, etc.), or other qualities that will be described herein. In this way, a source of the aerosol 120 may be determined by the processing circuitry 40.

Figures 7, 8:
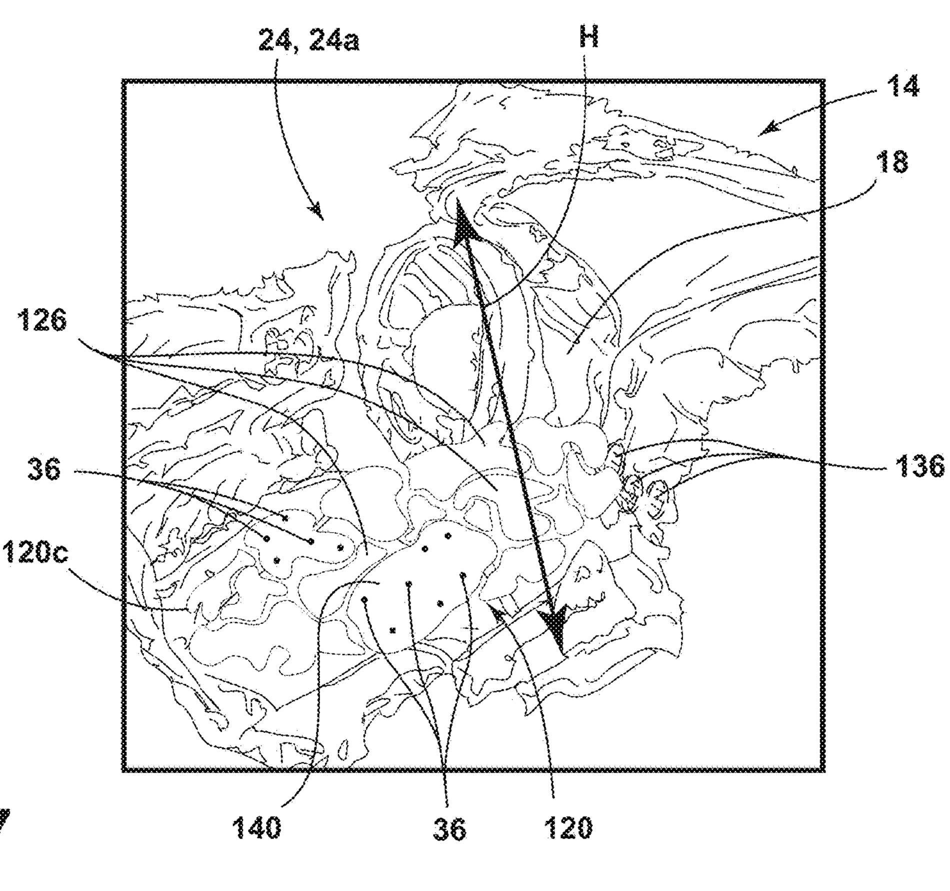
FIG. 7 depicts a point cloud generated using LiDAR and representing a cloud in an interior of a vehicle.
FIG. 8 depicts a point cloud generated using LiDAR and representing a cloud in a region exterior to a vehicle.

Referring now to FIGS. 7 and 8, point clouds 24*a*, 24*b* representing the interior 18 (FIG. 7) and the region exterior 20 (FIG. 8) may provide the three-dimensional spatial information needed for the detection system 10 to detect, identify, classify, and or otherwise determine various qualities regarding the aerosol 120 in the environment 14. For example, as will be described further herein, the processing circuitry 40 may be configured to estimate the quality of the aerosol 120 based on the three-dimensional positional information of the points associated with the aerosol 120. For example, and in reference to FIG. 7, if, in the absence of a first aerosol 120*c* in the interior 18, depth information of the seat 34 of the vehicle 12 could be determined, the processing circuitry 40 may determine that material, such as aerosol 120, is disposed between the time-of-flight sensor 16 and the seat 34. For example, if points 36 associated with the seat 34 are no longer identified in the point cloud 24*a*, the processing circuitry 40 may determine that the absence of these points 36 is due to light reflecting off a surface closer to the time-of-flight sensor 16 than the seat 34. Based on the density of points 36 blocked and/or a distribution of points 36 in the point cloud 24 being arranged in a plume 124, or an abnormal shape in a region not typically occupied by reflective matter, the processing circuitry 40 may determine the presence and location of the aerosol 120. For example, the processing circuitry 40 may identify clusters 126 of the points 36 and estimate the distribution of the aerosol 120 based on the density of the cluster 126. In the example depicted in FIG. 7, for example, dimensional information related to the seat 34 may be limited due to the aerosol 120 obstructing light emitted from the LiDAR modules 22 and reflecting back on aerosol 120 as opposed to reflecting off of the seat 34 of the vehicle 12.

Referring now to FIG. 8, the time-of-flight sensors 16 may be configured to capture point cloud 24*a* of the region exterior 20 to the vehicle 12 to identify a second aerosol 120*d* outside the vehicle 12. In the example illustrated, the region exterior 20 to the vehicle 12 is in a rear of the vehicle 12. The second point cloud 24*b* may include depth information of exhaust clouds due to output of an engine of the vehicle 12. It is contemplated that the exhaust clouds may be from another vehicle other than the vehicle 12 incorporating the detection system 10. The processing circuitry 40 may be configured to determine the source of the exhaust cloud based on proximity to other vehicles detected in the region exterior 20 to the vehicle 12. For example, other monitoring systems for the vehicle 12, such as rear backup cameras, RADARs, or the like may be configured to detect the presence of other vehicles and therefore associate the source of the exhaust fumes with the other vehicles. In some examples, the LiDAR modules 22 may be configured to extract point clouds 24 of other vehicles and cause the processing circuitry 40 to associate the exhaust clouds with the other vehicles. In general, by detecting and identifying aerosols 120 in the region exterior 20 to the vehicle 12, a source of the aerosol 120 in the passenger cabin 32 (FIG. 7) may be determined to be originating from the region exterior 20 to the vehicle 12. Accordingly, communication between the processing circuitry 40 and the other vehicle systems previously described, such as the climate control system 72, may allow the system to detect inefficiencies and/or efficiencies related to isolation or fluid communication between the region exterior 20 and the interior 18 of the vehicle 12.

For example, if the processing circuitry 40 detects the presence of exhaust clouds in the region exterior 20 to the vehicle 12 and an exhaust cloud in the interior 18 of the vehicle 12, the processing circuitry 40 may determine that there is fluid flow between the region exterior 20 to the vehicle 12 and the interior 18 of the vehicle 12. Alternatively, if the processing circuitry 40 determines that the aerosol 120 in the region exterior 20 to the vehicle 12 is different than the aerosol 120 in the interior 18 of the vehicle 12, the processing circuitry 40 may determine that the source of the aerosol 120 in the interior 18 of the vehicle 12 is not from the region exterior 20 to the vehicle 12. For example, mist may be identified in the region exterior 20 to the vehicle 12, and smoke may be determined to be present in the interior 18 of the vehicle 12. In this example, the processing circuitry 40 may determine the source of the smoke to be an occupant 26 smoking a cigarette, a cigar, a vape pen, or the like, an inefficiency of an engine of the vehicle 12, or another source not directly related to the mist in the region exterior 20 to the vehicle 12. It is contemplated that these examples are not intended to be limiting and that the processing circuitry 40, as described further herein, may be configured to associate an identity of the aerosol 120 in the region exterior 20 to the vehicle 12 and the aerosol 120 in the interior 18 of the vehicle 12 in any logical fashion for determining qualities and/or a source for the aerosol 120 in the region exterior 20 and/or the interior 18 of the vehicle 12.

It is contemplated that the detection system 10 may employ the machine learning models 66 to classify the shapes, sizes, or movements of the aerosols 120 based on known shapes. For example, elongated cylindrical shapes that expand from a central location may be differentiated by the processing circuitry 40 from a large number of less dense clusters 126 that may be associated with fog or mist. Further, the level of light reflectance, or amount of light reflectance, may be determined by the processing circuitry 40 and, in response, the processing circuitry 40 may determine the source of the aerosol 120 or the identity of the aerosol 120.

Figure 9:
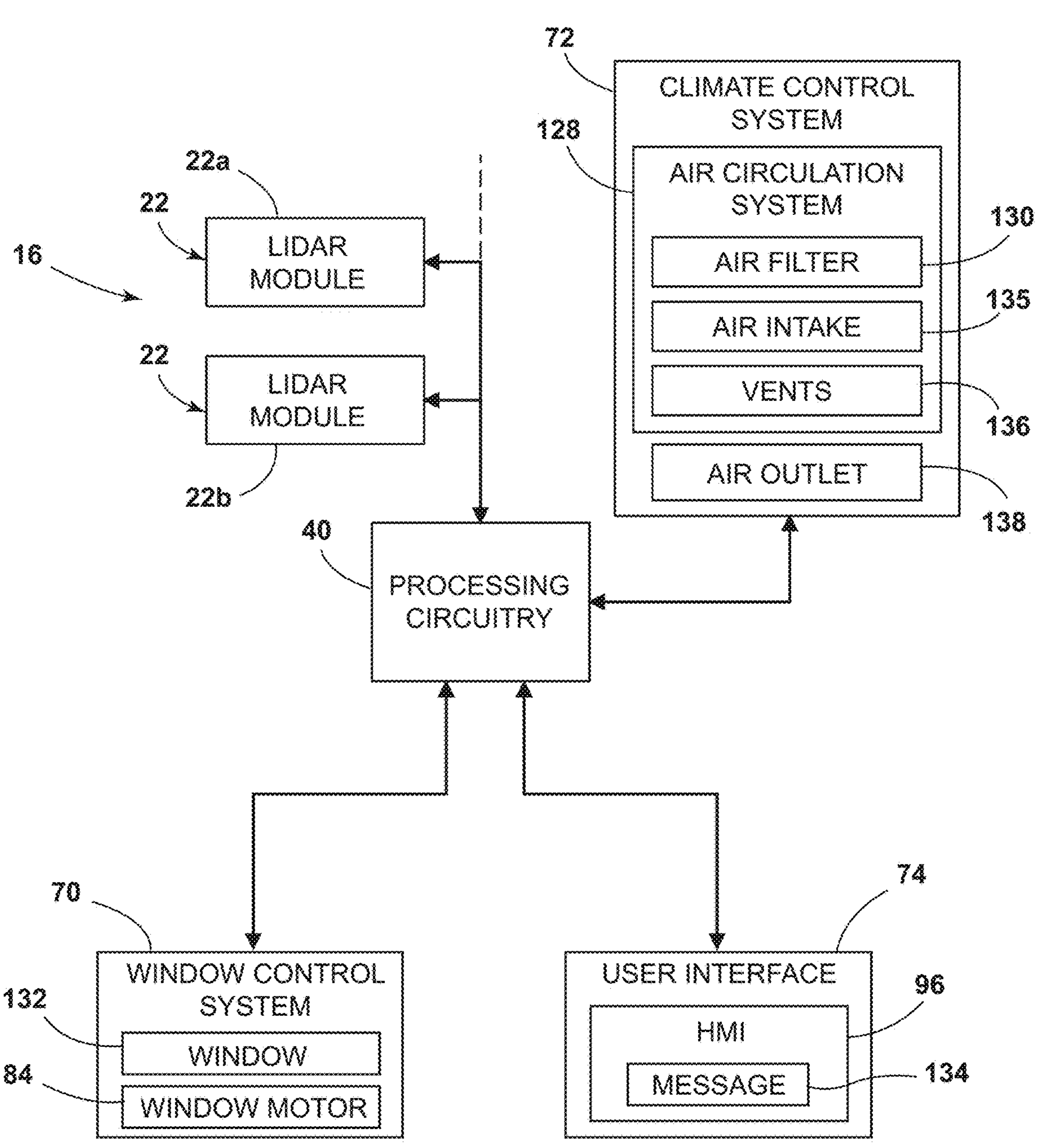
FIG. 9 is a block diagram of an exemplary detection system for a vehicle.

Referring now to FIG. 9, the detection of the aerosols 120 in the interior 18 of the vehicle 12 or the region exterior 20 of the vehicle 12 may cause the processing circuitry 40 to communicate instructions with one or both of the climate control system 72, and the window control system 70. The climate control system 72 may include an air circulation system 128 that incorporates at least one air filter 130 for filtering air from the region exterior 20 to the vehicle 12 toward the interior 18. Although classified as a portion of the climate control system 72, it is contemplated that the air circulation system 128 may be a separate system from the climate control system 72. The air circulation system 128 may monitor and control fluid flow to various vents 136 throughout the vehicle 12, as well as an intake 135 for air from the region exterior 20 to the vehicle 12. Further, the air circulation system 128 may be incorporated with the window control system 70 or may be independent from the window control system 70.

The window control system 70 may include a window 132 and the motor 84 for driving the window 132 between open and closed states. The window 132 may be a sunroof or moonroof window, a side window, a venting window (e.g., a window that may move to a partially-open position), or any other window of the vehicle. In general, detection, identification, and classification of the aerosol 120 may result in adjusting the air circulation system 128 and/or the window control system 70 to control airflow between the region exterior 20 and the interior 18 of the vehicle 12. The processing circuitry 40 may operate in an inverse mode, in addition, or in the alternative, in which conditions of the air circulation system 128 and/or the window control system 70 are determined or estimated by the processing circuitry 40 based on the point clouds 24*a*, 24*b* captured by the LiDAR modules 22.

For example, in one operation, the processing circuitry 40 may determine an efficiency of the air filter 130 of the air circulation system 128 of the vehicle 12 based on a comparison of a first point cloud 24*a* generated based on the interior 18 of the vehicle 12 to a second point cloud 24*b* generated based on the region exterior 20 to the vehicle 12. The efficiency may refer to the number of particulates per volume or volumetric flow captured by the filter 130, a percentage of particulates captured by the filter 130, or a level of fluid flow through the filter 130. Thus, in an example previously described in relation to FIGS. 7 and 8, if exhaust smoke is detected in the region exterior 20 to the vehicle 12 and in the interior 18 of the vehicle 12 and the windows 132 are in a closed state, the processing circuitry 40 may determine that the air filter 130 is not fully efficient or has a particular efficiency level below a certain threshold.

In another example, an indication from the air circulation system 128 may be communicated to the processing circuitry 40 indicating that the air circulation system 128 and/or the climate control system 72 is in a recirculation mode. Continuing with this example, the processing circuitry 40 may be configured to determine an inefficiency of the air filter 130 based on the exhaust smoke from the region exterior 20 remaining in the interior 18 despite the air circulation system 128 being in the recirculation mode. Stated differently, the filter 130 may have a first efficiency related to filtering particulates of aerosols 120 from the region exterior 20 to the interior 18 of the vehicle 12 and a second efficiency level related to a level of recirculation efficiency. In other examples, the air intakes 135, which may be selectively closed or opened depending on whether the air circulation system 128 is in the recirculation mode, may be gauged or monitored by comparison of the first point clouds 24*a* to the second point clouds 24*b*. For example, an inefficiency of the air circulation system 128 may be due to improper operation of the intake 135 or another component of the air circulation system 128 that controls fluid communication between the region exterior 20 to the vehicle 12 and the interior 18 of the vehicle 12.

In other examples, the processing circuitry 40 may determine an efficiency or inefficiency of a venting operation performed by the detection system 10, by operation with the climate control system 72 and the window control system 70. For example, upon detection of the first point cloud 24*a*, the processing circuitry 40 may be configured to enter a venting operation in which the air in the interior 18 is exited through air outlets 138 to the region exterior 20 to the vehicle 12, and if the processing circuitry 40 continues to detect the aerosol 120 based on the first point cloud 24*a* in the interior 18, the processing circuitry 40 may determine an inefficiency of the venting operation and, accordingly, the air outlets 138. In response, the processing circuitry 40 may communicate an instruction to the window control system 70 to control the motor 84 for the window 132 to move the window 132 toward the open position to manually vent the air in the interior 18 to the region exterior 20. In some examples, the window control system 70 may receive a signal from a position sensor, an encoder for the motor 84, or another detector, that indicates the position of the window 132. Software may be employed to detect current ripples or rotations of the motor 84. Accordingly, the position of the window 132 may be separately monitored to verify the position of the window 132. Thus, the processing circuitry 40 may be employed to perform a check, or validation, of the position of the window 132. It is contemplated that other examples related to detection and responsiveness to the aerosols 120 in the interior 18 and/or the region exterior 20 may be effectuated by the detection system 10, as will be described further herein. For example, the processing circuitry 40 may communicate with the user interface 74 to present a message 134, or notification, as an alert to the source of the aerosol 120, the efficiencies of the air circulation system 128, or another indication to the user to instruct the user to open the window 132, close the window 132, deactivate the air circulation system 128, activate a particular operation of the air circulation system 128 (e.g., recirculation, venting operation, etc.), or another action, such as communicating to the occupant 26 to leave the vehicle 12 based on the alert.

In addition to detection, identification, and classification of the aerosols 120 in the environment 14 of the vehicle 12, the detection system 10 of the present disclosure may also provide for more accurate determinations of the aerosol 120 as compared to detection by other IR or NIR sensing systems. For example, because LiDAR may be reflected off of airborne particulates having low densities, the processing circuitry 40 may compare the at least one point cloud 24 captured in a first instance to the at least one point cloud 24 captured in a second instance. Such operation may allow the detection system 10 to ignore temporary oddities (e.g., common dust particles). Stated differently, by comparing recent scans against latest scans generated by the LiDAR modules 22, false alerts may be omitted or significantly reduced, and the detection system 10 may ignore temporary phenomena occurring between the time-of-flight sensors 16 and a target surface 38 in the vehicle 12.

With continued reference to FIG. 9, the processing circuitry 40 may be configured to execute a classification algorithm that may compare the at least one point cloud 24 captured or generated by the LiDAR modules 22 to historical data, such as data stored in the server 60, as previously described with respect to FIG. 4. Based on this comparison, the processing circuitry 40 may be configured to map each point cloud 24 to a shape, a size, a location, a dynamic movement, a viscosity, identity, or any other quality of the aerosol 120. For example, to determine the size of one or more of the point clouds 24, the processing circuitry 40 may calculate an area 140 (FIGS. 7 and 8) of each point cloud 24 and, based on the area 140 of each point cloud 24, determine a size of the aerosol 120. With regard to classification for shape, processing circuitry 40 may process the three-dimensional data from the at least one point cloud 24 in two-dimensional image analysis or three-dimensional geometrical comparisons to identify spherical contours, tetrahedral contours or shapes, or any other geometry or proportion. The processing circuitry 40 may also be configured to identify the location of the aerosol 120 (see FIG. 5) based on the zones 122 and associate the location of the aerosol 120 with other vehicle components, such as vents 136, regions associated with the occupants 26 (e.g., the face or mouth), or the like. For example, the processing circuitry 40 may determine the location of the aerosol 120 to be adjacent the seat 34, a steering wheel, a windshield, a brake/gas pedal, a console, or any other identifiable feature from the LiDAR modules 22, or another monitoring system of the vehicle 12. Based on the location, the processing circuitry 40 may identify the aerosol 120 and/or a source for the aerosol 120. For example, because water vapor may tend to pool in the lower portions of the compartment 28, whereas smoke may tend to rise in the compartment 28, the processing circuitry 40 may detect a height H (FIG. 7) of the aerosol 120 in the compartment 28 or in the region exterior 20 and identify the aerosol 120 based on the height H.

A movement of the aerosol 120 may also be detected by the processing circuitry 40. For example, the processing circuitry 40 may compare various sequential scans by the LiDAR modules 22 to one another in order to determine the source of the aerosol 120. For example, the processing circuitry 40 may determine changes in color, shape, size, location, or the like of a plume 124 to estimate an origin for the plume 124. In some examples, the detection system 10 may also provide for detection of a flooding event based on occluded areas of the compartment 28 according to the at least one point cloud 24. For example, the processing circuitry 40 may detect a flat or even depth from the LiDAR module 22 indicating a water level throughout the compartment 30, and the processing circuitry 40 may correlate the flat depth distributions with a viscous or dense fluid in the compartment 30, as opposed to an airborne particulate or other aerosol 120. Following classification of the at least one point cloud 24 into different features such as shape, color, size, location, movement, viscosity, density, or the like, the processing circuitry 40 may execute a response determination algorithm in which the particular response generated by the processing circuitry 40 is determined based on a response level required for the occupant 26. The response detection algorithm will be described in further detail in relation to FIG. 11 and may relate to the source of the aerosol 120 (e.g., a thermal event), policies related to permissible activity in the interior 18 (e.g., smoking), or any other response that may be effectuated by the processing circuitry 40 in communication with the vehicle systems previously described.

Figure 10:
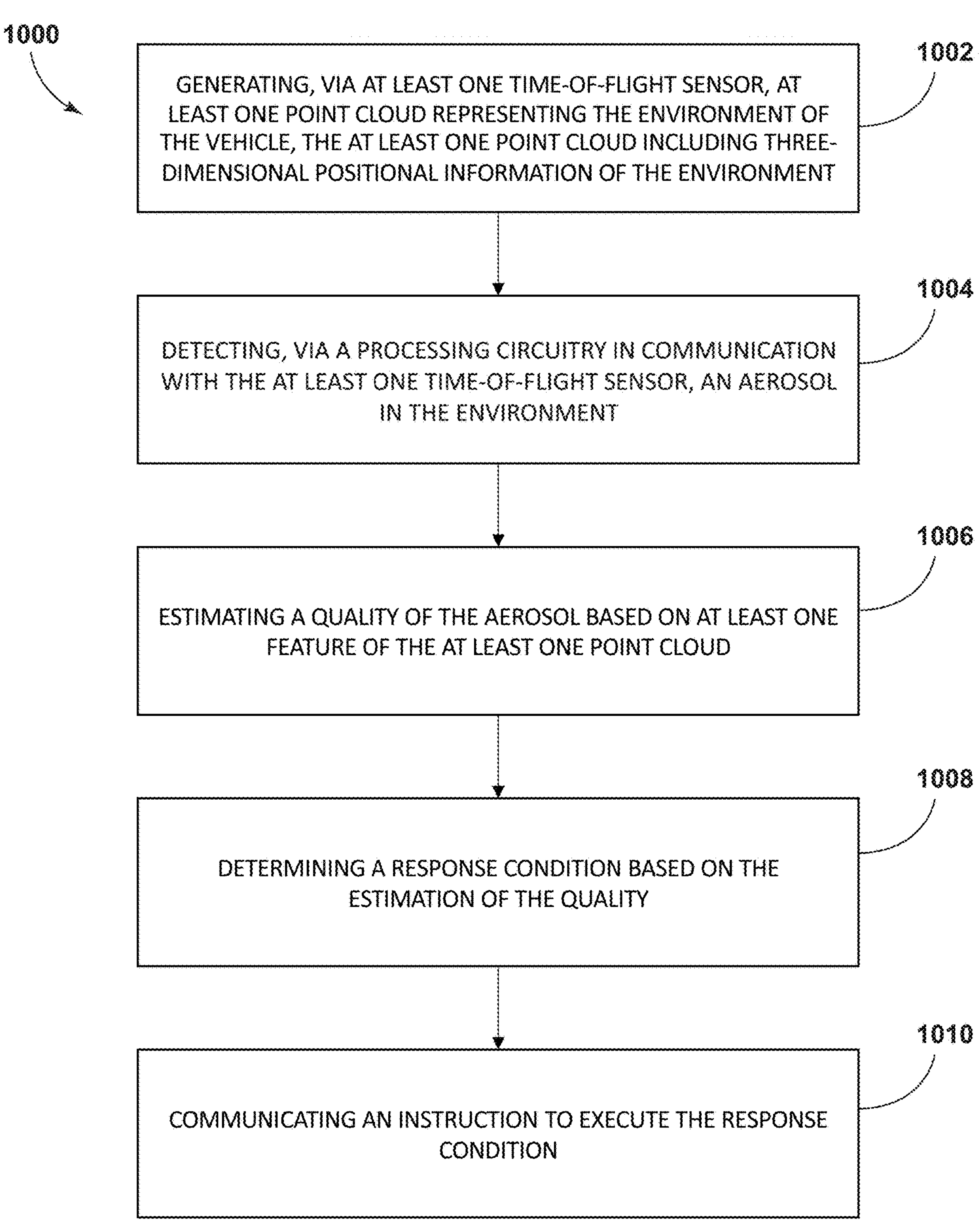
FIG. 10 is a block diagram of a method for monitoring an environment of a vehicle.

Referring now to FIG. 10, a method 1000 for monitoring the environment 14 of the vehicle 12 may include generating, via the at least one time-of-flight sensor 16, at least one point cloud 24 representing the environment 14 of the vehicle 12 at step 1002. The at least one point cloud 24 may include three-dimensional positional information of the environment 14. The method 1000 may further include detecting, via the processing circuitry 40 in communication with the at least one time-of-flight sensor 16, the aerosol 120 in the environment 14 at step 1004. The method 1000 may further include estimating a quality of the aerosol 120 based on at least one feature of the at least one point cloud 24 at step 1006. For example, the quality of the aerosol 120 may be a size, a shape, a movement, a level of light reflectance, a color, identity, or another attribute of the aerosol 120. The at least one feature may include various aspects or attributes of the at least one point cloud 24, such as a shape of the point cloud 24, an area 140 of the point cloud 24, a concentration of points 36 in the point cloud 24, coordinates of the points 36, relative distances between points 36 corresponding to the location of the aerosol 120, or the like. For example, the clusters 126 of points 36 may be associated with the aerosol 120, whereas isolated points may be disregarded by the processing circuitry 40. The method 1000 further includes determining a response condition based on the estimation of the quality of the aerosol 120 at step 1008. For example, the processing circuitry 40 may determine that a venting operation should be executed by the climate control system 72 or air circulation system 128, that the window 132 should be opened by the window control system 70, that an alert should be presented at the user interface 74, or any other response that will be described further herein. The method 1000 further includes communicating an instruction to execute the response condition at step 1010. For example, the processing circuitry 40 may communicate a control signal that causes the climate control system 72 to adjust baffles or vents 136 within the air circulation system 128 to cause the air to circulate into or out of the interior 18 of the vehicle 12 from the region exterior 20 to the vehicle 12.

Figure 11:
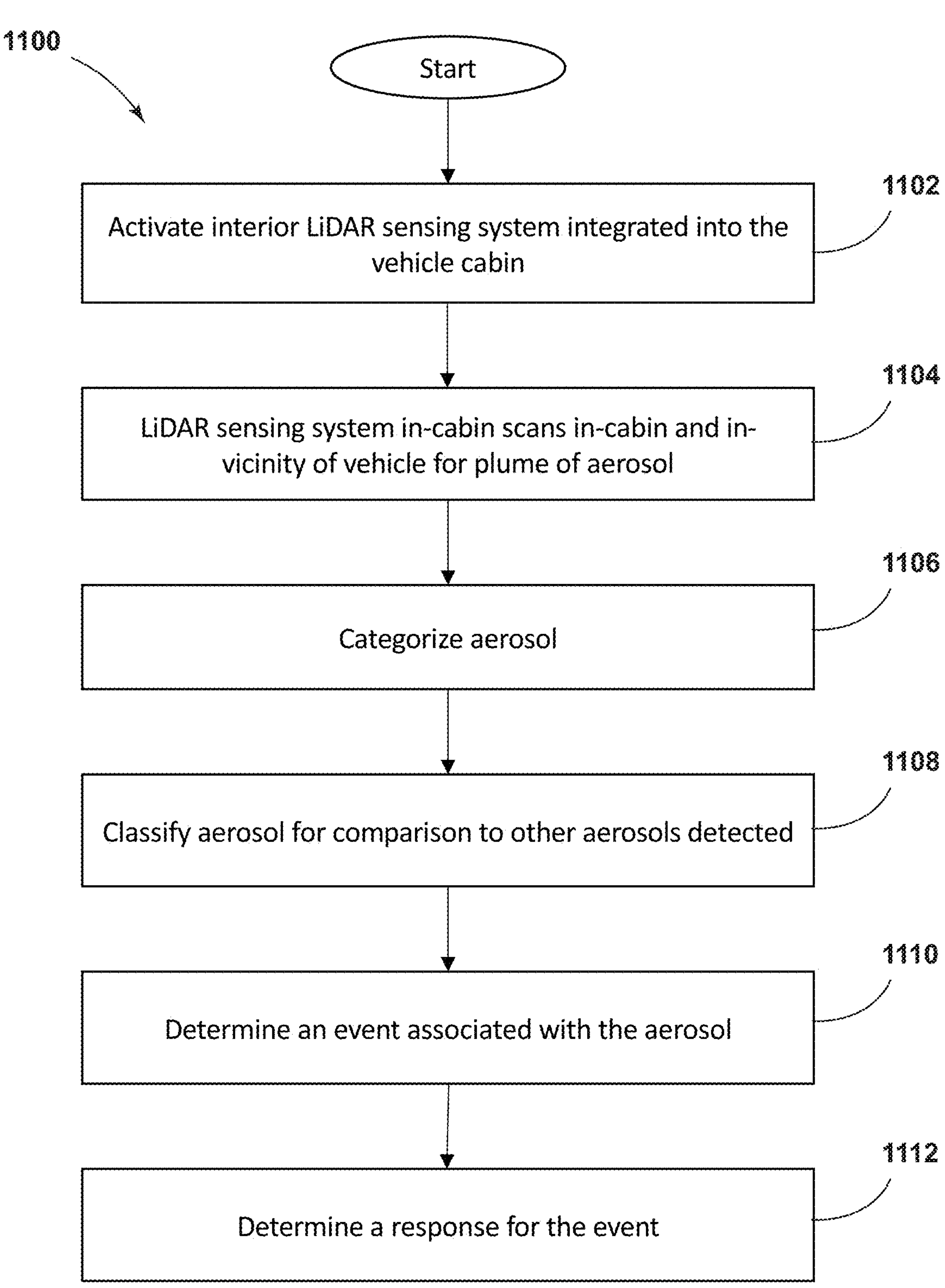
FIG. 11 is a block diagram of a process performed by a system for monitoring an environment of a vehicle.

Referring now to FIG. 11, an exemplary process 1100 carried out by the detection system 10 may include activating an interior LiDAR sensing system integrated into the compartment 28 of the vehicle 12 at 1102. At 1104, the LiDAR sensing system may scan the interior 18 of the vehicle 12 and the region exterior 20 to the vehicle 12 for the presence of an aerosol 120 in the environment 14. Following detection of the aerosol 120 in the environment 14, the detection system 10 may categorize the aerosol 120 to be associated with an event, such as the occupant 26 smoking a cigarette, a polluted environment 14, a dust cloud, or another event related to the presence of aerosols 120 at 1106. At 1108, the processing circuitry 40 may classify the aerosol 120 for comparison to other aerosols 120 detected. For example, as previously described in relation to FIGS. 7 and 8, the processing circuitry 40 may compare the first point cloud 24*a* to the second point cloud 24*b* to determine whether any relationship exists between the first aerosol 120*c* and the second aerosol 120*d*.

It is also contemplated that the processing circuitry 40 may, upon classification of each aerosol 120, prioritize removal or elimination of one aerosol 120 over the other aerosol. For example, if smoke is detected in the compartment 28 of the vehicle 12 and mist is detected in the compartment 28 of the vehicle 12 as well, the instruction communicated to the window control system 70 and/or the climate control system 72 may be based on elimination of the smoke versus elimination of the mist. Following classification, at 1110, the processing circuitry 40 may determine an event associated with the aerosol 120. For example, the smoke may be associated with smoking, and the mist may be associated with a time of day, such as the morning, or a geographical region also high in humidity. At 1112, the processing circuitry 40 may determine the response for the event and, as previously described, may communicate the response to other vehicle systems to inform the occupant 26, control one of the vehicle systems, or effectuate any response needed for elimination, reduction, or mitigation of the aerosol 120 in the environment 14.

Referring more generally to FIGS. 10 and 11, the response determined by the processing circuitry 40 may be correlated to a level of intensity associated with the event determined by the processing circuitry 40. For example, if the shape of the at least one point cloud 24 is a short streamline flowing from a top area or upper area of the seat 34 in the vehicle 12 and out of the open window 132, the processing circuitry 40 may determine that the event is an occupant 26 smoking event. In response, the processing circuitry 40 may communicate an instruction to present, at the user interface 74, an indication or descriptive notification to not smoke in the compartment 28 of the vehicle 12. In another example, a plume 124 of smoke may be detected as entering the vehicle 12 from the region exterior 20 to the vehicle 12 through an opening selectively covered by the window 132, and the indication presented at the user interface 74 may be the message 134 to close the windows 132. In general, the response generated by the processing circuitry 40 may be categorized as one of an indication, a descriptive notification, and an actuation. It is further contemplated that, via the artificial intelligence engine 64 previously referred to in FIG. 4, the effectiveness of a response may be modified over time based on historical data stored in the server 60 in order to refine the response determined by the processing circuitry 40. For example, if, historically, alerting the user to close the window 132 is ineffective to cause the occupant 26 to close the window 132, the processor may communicate an instruction to the window control system 70 to automatically close the window 132. In other examples, internal timers may be programmed in the processing circuitry 40 based on the machine learning model 66, which may be configured to optimize elimination of the aerosol 120 in the environment 14 of the vehicle 12.

The alert response may refer to communicating a signal to activate or "wake up" additional LiDAR modules 22 to achieve more precise scans of the environment 14. For example, if operating in a power saving mode, one LiDAR module 22 may be scanning the interior 18 while a plurality of secondary LiDAR modules 22 are in a sleep state. Upon detection of the aerosol 120 based on the point cloud 24 generated by the one LiDAR module 22, the processing circuitry 40 may be configured to energize the secondary LiDAR modules 22 to provide greater accuracy in detecting the features of the point cloud 24, such as the shape, the movement, or the other features previously described. In the descriptive notification response, the processing circuitry 40 may communicate the message 134 to the occupant 26 or occupants 26 to take an action to mitigate the presence of the aerosol 120. For example, the message 134 may be, as previously described, an instruction to open the window 132, activate a re-circulation mode, a venting mode, or another climate control mode. Continuing with this example, the descriptive notification may be to deactivate an air conditioning unit or a heating unit for the vehicle 12 in order to mitigate the presence of the aerosol 120 in the compartment 28.

The actuation response may refer to an automatic adjustment to one or more of the vehicle systems previously described in an attempt to mitigate the presence of the aerosol 120. For example, automatically adjusting operation of the climate control system 72 or air circulation system 128 to a venting mode, a re-circulation mode, or automatically opening or closing the windows 132 in response to detection of the aerosol 120 in the interior 18 or the region exterior 20 to the vehicle 12 may be the actuation response. In other examples, the processing circuitry 40 may communicate an instruction to control a motion of the vehicle 12 to stop the vehicle 12 in response to classification of the source of the aerosol 120 as smoking. In some examples, the response condition may be to adjust, or communicate an instruction to adjust, at least one parameter of the time-of-flight sensor 16 according to the response detection algorithm. For example, the processing circuitry 40 may communicate with the controller 48 to adjust a scanning direction or orientation (e.g., rotational mode or another mode) and/or a scanning frequency of the LiDAR module 22. For example, the LiDAR module 22 may be configured to adjust a wavelength of the light pulses, a number of rotations per minute (RPM), of the scanning, or another operational parameter.

In general, the detection system 10 may provide for aerosol 120 detection in the environment 14 of the vehicle 12 and activation of a response for the occupant 26. For example, dust, steam, smoke, vapor, smog, or other aerial phenomena may be detected by the use of LiDAR, and, based on the various features of the aerial phenomena detected, the detection system 10 may determine efficient responses to mitigate the aerial phenomena. Thus, the detection system 10 may categorize the aerial phenomena based on parameters related to the source of the aerial phenomena and create a more stable and user-friendly environment 14 in the vehicle 12. Further, the detection system 10 may limit the need for less efficient aerosol detection systems, such as smoke detectors or complex monitoring systems that rely upon many different sensors of the vehicle systems to determine an event. Thus, by employing a single sensing system (LiDAR) in lieu of multiple different sensing systems, complexity, scheduled service replacement, additional architecture, data processing, and additional communications may be reduced. Further, the detection system 10 may be employed for enforcement of no-smoking policies in rental or business vehicles by notifying occupants 26 in the vehicle 12 or other remote users (e.g., businesses) of the presence of the aerosol 120 and/or event of smoking.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A method for monitoring an environment of a vehicle, the method comprising:

generating, via at least one time-of-flight sensor, at least one point cloud representing the environment of the vehicle, the at least one point cloud including three-dimensional positional information of the environment, wherein the at least one time-of-flight sensor includes a first LiDAR module configured to generate a first point cloud of a compartment of the vehicle and a second LiDAR module configured to generate a second point cloud of a region exterior to the vehicle;

detecting, via a processing circuitry in communication with the at least one time-of-flight sensor, an aerosol in the environment;

estimating a quality of the aerosol based on at least one feature of the at least one point cloud;

determining a response condition based on the estimation of the quality;

communicating an instruction to execute the response condition;

identifying the aerosol in the second point cloud;

comparing the second point cloud to the first point cloud; and determining an efficiency of an air filter of an air circulation system of the vehicle based on the comparison of the second point cloud to the first point cloud.

2. The method of claim 1, further comprising:

receiving an indication of the air circulation system being in a recirculation mode; and determining an efficiency of the recirculation mode based on the comparison.

3. The method of claim 2, further comprising:

determining an open state of a window of the vehicle based on the efficiency of the recirculation mode.

4. The method of claim 3, further comprising:

communicating, via a window control system of the vehicle, a control signal to close the window based on the response condition.

5. The method of claim 4, further comprising:

adjusting at least one operational parameter of the at least one time-of-flight sensor based on the response condition.

6. The method of claim 5, wherein the at least one operational parameter includes at least one of a scanning direction and a scanning frequency, the method further comprising:

controlling at least one of the scanning direction and the scanning frequency.

7. The method of claim 1, wherein the quality of the aerosol includes at least one of an identity, a location in the environment, a size of a cloud of the aerosol, a shape of the cloud, a level of light reflectance, a color, a density, a movement, or any combination thereof.

8. The method of claim 7, further comprising:

determining a source of the aerosol based on the identity of the aerosol.

9. The method of claim 8, further comprising:

determining the level of light reflectance based on the at least one point cloud; and determining the identity based on the level of light reflectance.

10. The method of claim 7, wherein the location includes an area of a compartment of the vehicle and a region exterior to the vehicle, and further comprising:

identifying the location based on the at least one point cloud; and determining a source of the aerosol based on the location.

11. The method of claim 7, further comprising:

determining a source of the aerosol based on the movement.

12. The method of claim 7, further comprising:

determining a source of the aerosol based on the shape.

13. A system for monitoring an environment of a vehicle, the system comprising:

a first LiDAR module configured to generate a first point cloud of a compartment of the vehicle;

a second LiDAR module configured to generate a second point cloud of a region exterior to the vehicle;

an air circulation system of the vehicle including an air filter and configured to operate in an air recirculation mode;

processing circuitry in communication with the first and second LiDAR modules, the processing circuitry configured to:

identify an aerosol in the region exterior to the vehicle based on the second point cloud;

compare the second point cloud to the first point cloud; and determine an efficiency of the air filter based on the comparison of the second point cloud to the first point cloud.

* * * * *